Jan. 20, 1942. E. C. CORK ET AL 2,270,416
ELECTRICAL WAVE SYSTEM
Filed Dec. 22, 1937   3 Sheets-Sheet 1

INVENTORS
EDWARD CECIL CORK
JOSEPH LADE PAWSEY
BY
ATTORNEY

Patented Jan. 20, 1942

2,270,416

UNITED STATES PATENT OFFICE 2,270,416

ELECTRICAL WAVE SYSTEM

Edward Cecil Cork, London, and Joseph Lade Pawsey, Hillingdon, England, assignors to Electric & Musical Industries Limited, Middlesex, England, a company of Great Britain Application December 22, 1937, Serial No. 181,136
In Great Britain December 23, 1936

12 Claims. (Cl. 178—44)

The present invention relates to electric wave filters of the band pass and band stop type for use at high frequencies, and is particularly concerned with such filters for the separation or combination of sound and vision signals of a television system.

Such filter circuits may be necessary for the elimination of the narrower band of sound frequencies from the complete band as supplied, for example, from a receiving system which is sufficiently non-selective. Another application of such filters is to the separation of the two bands of frequencies, in order that these may be supplied without appreciable attenuation to separate sight and sound receivers. Again, they may be used to combine the outputs from separate sound and sight transmitters into a common feeder system or to a common amplifier.

The desirable features of filters for these applications are that they should adequately attenuate the unwanted frequencies and pass without substantial attenuation and with substantially equal time delay all frequencies within the pass range. It is further desirable that the transition region from pass to stop should occupy the narrowest possible band of frequencies so that the total band should be a minimum for given vision and sound bands. Further, it is desirable that the input impedance should be constant at all significant frequencies in order to prevent for example, reflected waves being set up on a feeder system.

In a particular case, for example, the vision signal frequency range may extend from 42.5 to 47.5 megacycles and the sound signal frequencies may extend over the much narrower range from 41.48 to 41.52 megacycles.

One of the objects of the present invention is to provide filters which permit adequate separation of frequency bands of this order.

According to the present invention, an electric wave filter system for separating or combining signals extending over different frequency bands includes a length of transmission line and a tuned circuit which, in conjunction with said length of line, serves to reject or to pass a predetermined band of frequencies. A second tuned circuit tuned to the same frequency as the first mentioned tuned circuit may also be connected in said transmission line, the tuned circuits being spaced apart by a quarter of a wavelength at the frequency to which said circuits are tuned in order that one of said tuned circuits shall be effective as an inverse circuit at the point at which the other tuned circuit is connected. Again the tuned circuit may be spaced apart from another tuned circuit by one quarter of a wavelength at the mid-frequency of a given frequency band, the reactance of said tuned circuits compensating each other over the range of frequencies in another band.

In a particular application of the invention, a transmission line is terminated by a load resistance, and at least two series tuned circuits presenting a low resistance to a selected frequency band are connected in shunt to said transmission line at points spaced apart by substantially one quarter of a wavelength at the mid-frequency of said selected frequency band. Alternatively, two parallel tuned circuits presenting a high resistance to a selected frequency band may be connected in series with said transmission line at points spaced apart by substantially one quarter of a wavelength at the mid-frequency of said selected frequency band. Again, a combination of series and parallel tuned circuits connected in shunt or in series respectively may be employed.

In a further application of the invention, a constant resistance filter for separation of two frequency bands comprises two branching quarter wavelength lines each terminated by a load resistance and a tuned circuit, the two tuned circuits being inverse with respect to the characteristic impedance of the line. Band stop filters may be inserted in the individual channels of the band separating filter to provide further attenuation of the unwanted frequencies. Again, band separating filters may be provided having a constant resistive input impedance over a frequency range covering both bands of frequencies to be separated. Filter circuits in acordance with the invention may be used to separate more than one narrow frequency band from a relatively wide range of frequencies.

In order that the invention may be more clearly understood and readily carried into effect, a number of filter circuits embodying the invention will now be described, by way of example, in greater detail in connection with the accompanying drawings wherein Fig. 1 shows one form of band-pass filter circuit capable of rejecting unwanted signal frequencies according to the present invention; Fig. 2 is the electrical equivalent of Fig. 1 and serves to explain the action of the latter circuit; Fig. 3 shows a second form of filter; Fig. 4 is a combination of the filters disclosed in Figs. 1 and 3; Fig. 5 is still another form of band-pass filter; and Fig. 6 is a modification of the circuit shown in Fig. 3. Fig. 7 discloses a system of filter circuits designed to separate vision and sound frequency bands, and Fig. 8 is an equivalent circuit. Figs. 9 to 17 inclusive are various modifications of the system according to the invention.

Referring to Fig. 1, a filter circuit is shown which may be arranged to have an approximately constant input resistance and negligible attenuation over a range of vision frequencies and to attenuate heavily in the neighborhood of the sound carrier frequency to which the circuits are tuned. Two tuned circuits 1 and 2 resonant at the sound carrier frequency are placed in shunt to the receiver line a quarter of a wavelength apart, that is to say, $\theta$ the electrical length of the line between the tuned circuits is 90° at the sound carrier frequency. The line is terminated with a resistance R equal to the characteristic impedance $Z_0$ of the line. The series circuits 1 and 2 are such that their reactances are equal over the vision range of frequencies and are high compared with the characteristic impedance of the line. In these circumstances the reactance at A, the point of insertion of the circuit 1, is compensated by that at the point B, where the circuit 2 is inserted and the input impedance of the line over the vision frequency band is substantially equal to R. The resistance of the tuned circuits 1 and 2 at resonance must be low for high attenuation of the sound frequencies. With $R=Z_0$ and for a frequency at which $\theta$ is equal to 90° the mutual compensation of the reactances is exact when they are of high value, but it is possible to extend the compensation to a lower value of reactance by slightly modifying the length of line and the termination to allow the variation of electrical length of the line with frequency to produce additional compensation. The attenuation of each tuned circuit is a factor of the order of $r/Z_0$, where $r$ is the series resistance of the tuned circuits at resonance. The separation of a quarter wavelength affords the optimum attenuation in the stop band. The ratio of output to input volts is approximately equal to $(r/Z_0)^2$ and for $n$ circuits the ratio is approximately $(r/Z_0)^n$.

The action of the circuit may be more clearly understood by a consideration of the circuit of Fig. 2 which is the equivalent of Fig. 1 and is seen to be a half section of a standard band stop filter. The equivalence follows from the transforming action of the quarter wavelength line of characteristic impedance equal to the terminating impedance R. The values of the inductance L and capacity C of the parallel circuit are the inverse with respect to R of the capacity $c_1$ and inductance $l_1$ of the series circuit, thus providing a half-section of a constant-K filter.

Fig. 3 illustrates a similar arrangement using parallel circuits 4 and 5 tuned to the sound frequency, connected in series with the line. In this case the reactances will compensate if they are low over the vision band of frequencies. As in Fig. 1, circuits 4 and 5 are spaced apart by an electrical length $\theta$ equal to approximately a quarter of a wavelength at the sound carrier frequency and the line is terminated by a resistance R equal to the characteristic impedance $Z_0$ of the line. If the parallel circuit has a dynamic resistance D, the ratio of output to input volts equals $Z_0^2/D^2$.

Fig. 4 merely illustrates a combination of the two methods shown in Figs. 1 and 3. With the tuned circuits in the relative position shown in Fig. 4 optimum attenuation results. If, however, reactance compensation over the vision band is relatively more important than extreme attenuation, then one or other of the series circuits should be transferred to the other side of its associated parallel tuned circuit.

The circuit equivalent to Fig. 3, as Fig. 2 is equivalent to Fig. 1, is a half section of a constant-K band stop filter at the mid-series section.

The arrangements described with reference to Figs. 1 to 6 may be considered as elementary, serving to reject the unwanted signal frequencies. If the unwanted signal frequencies were sound carrier and side band frequencies, a separate aerial would be necessary to pick up the sound signals. Band separating circuits will now be described which are designed to separate vision and sound bands so permitting the use of a single aerial for the transmission or reception of both these bands.

Figure 1:
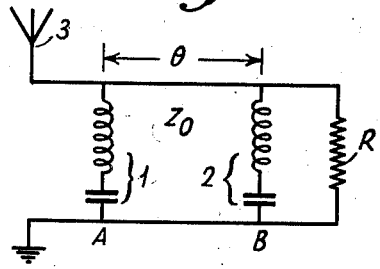
Figure 2:
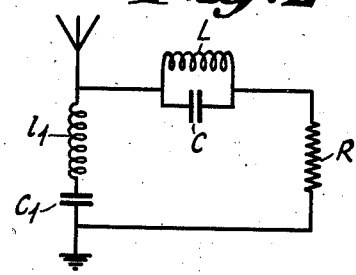
Figure 7:
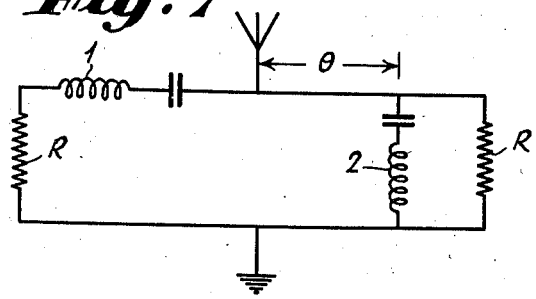
Figure 8:
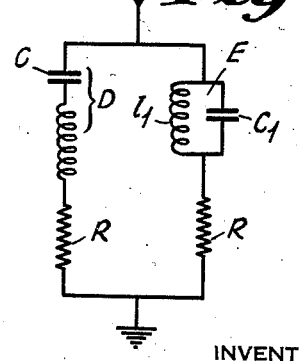

Referring now to Fig. 7, a development of the arrangement of Fig. 1 is shown in which the sound signals are obtained across a resistance of value R inserted in series with the first series tuned circuit 1. This resistance could, for example, be the input impedance of the sound receiver. The effect of the quarter wavelength separation between the circuits 1 and 2 is to transform the series tuned circuit 2 in shunt with R, into the inverse parallel tuned circuit E in series with R as shown in Fig. 8. Since in this arrangement the tuned circuits are inverse with respect to the resistance R, the impedance presented by the combination to the aerial is a constant resistance in accordance with one feature of the invention. The action of this equivalent circuit is, at the vision frequencies, that the circuit at D has become a high impedance and acts as a rejector circuit, while that at E becomes a low impedance circuit.

Since the impedance presented to the input is a constant resistance, the total power input is independent of frequency and assuming the losses in the tuned circuits are small, the power divides between the load resistances R.

Since at the vision frequency the circuit D has become a high impedance, substantially all the power in the vision band passes into the vision channel. Similarly, substantially the whole of the power in the sound band passes into the sound channel.

In order to obtain a sufficiently rapid transition between the two channels, it is necessary to make $wl$ large compared with $Z_0(=R)$ and $wl_1$ must be small compared to $Z_0$. Hence $wl/wl_1$ is very large and in practice must be of the order of 1000. This ratio leads to an impractical value of the condenser $c_1$ tuning the coil $l_1$ or alternatively to an impracticable value of $l$.

The advantage of Fig. 7 over this well-known circuit Fig. 8 is therefore apparent and lies in the fact that the component values are identical and their values are under control by varying $Z_0$.

Figure 9:
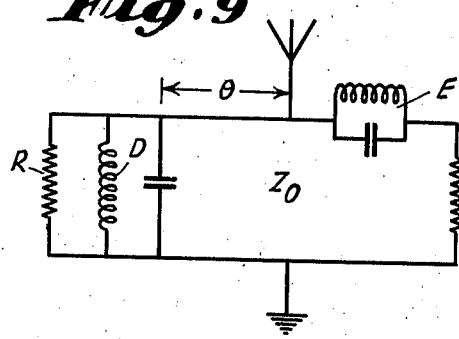

Fig. 9 shows an arrangement analogous to Fig. 7 but in which the series tuned circuit of Fig. 8 is obtained by the inversion of a parallel tuned circuit by the use of a quarter wavelength of transmission line of characteristic impedance $Z_0$ equal to R. The use of the circuits shown in Figs. 7 and 9 thus make it possible to employ either the series or parallel circuit whichever is more suitable from the point of view of components.

Figure 10:
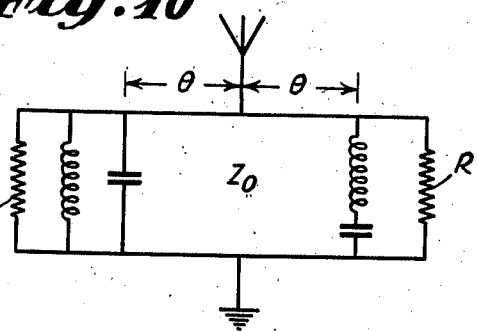

Fig. 10 shows a circuit using double inversion. While this has the disadvantage of Fig. 8 that both series and parallel tuned circuits are used, one of which may be difficult to realize in practice as previously stated, one side of each circuit is connected to earth and is therefore at zero high frequency potential. In Fig. 8 both sides of both tuned circuits will be at some high frequency potential relative to earth.

The parallel tuned circuits may be obtained in practice by the inversion of a series tuned circuit by means of a further quarter wavelength of line and vice-versa. Thus, in place of the parallel circuit there will be connected a quarter wavelength of line of characteristic impedance R terminated by a series tuned circuit of appropriate constants.

Figure 3:
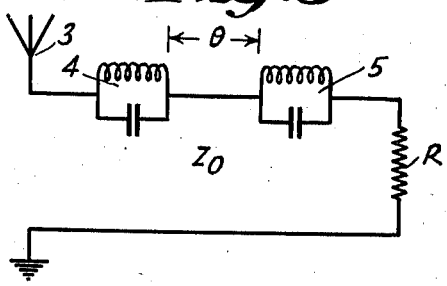
Figure 4:
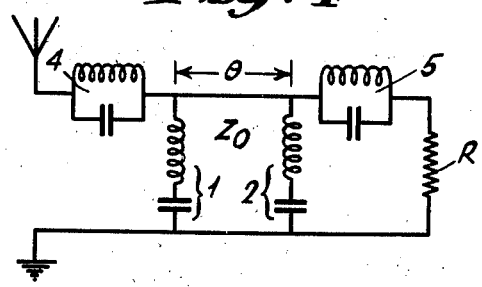
Figure 5:
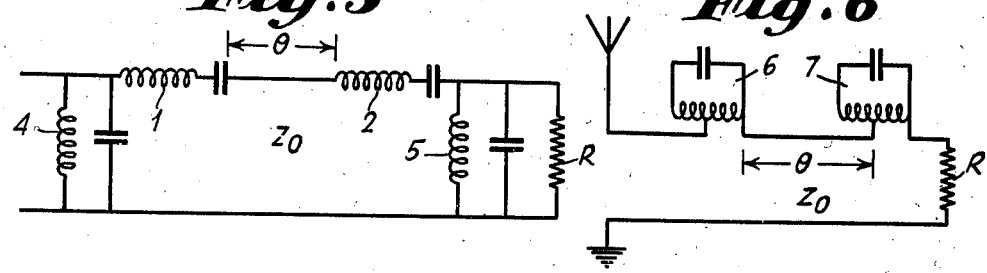
Fig. 5 shows a circuit which accepts sound signals and could be placed in the sound feeder.
Figure 6:
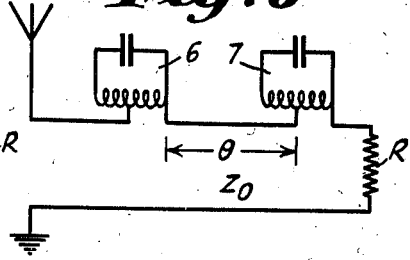
Fig. 6 shows a modification of the arrangement shown in Fig. 3 in which the rejector circuits 6 and 7 are tapped into the line in order to obtain greater selectivity.
Figure 11:
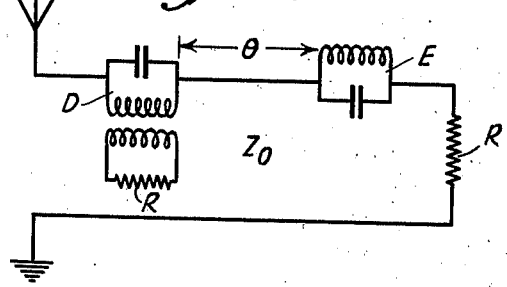

Fig. 11 shows how sound signals may be obtained from the circuit of Fig. 3 by coupling the impedance of the sound receiver represented by a resistance of value R to the tuned circuit at D.

Figure 12:
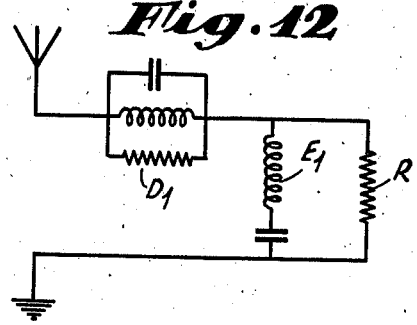

Fig. 12 shows the equivalent circuit of Fig. 11, the series tuned circuit shunted by the resistance at $E_1$ being the inverse network provided by the quarter wavelength transmission line in Fig. 11 of the tuned circuit E in series with the resistance R of this figure. The network of Fig. 12 is seen to be the alternative form of the constant resistance network, i. e., the inverse of Fig. 8.

Figure 13:
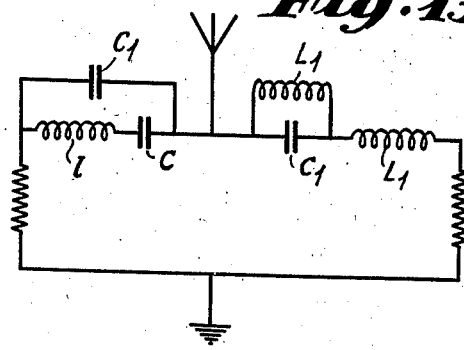

Fig. 13 shows a further arrangement which has a constant input resistance analogous to the arrangement shown in Fig. 8, but in which a third reactance is added to each circuit to increase the impedance of the sound arm and to lower the impedance of the vision arm over the vision band of frequencies. The series circuit $lc$ is tuned to the sound frequencies, and the condenser $C_1$ causes the circuit to tune as a parallel tuned circuit in the vision frequency range. In an analogous manner the inductance $L_1$ decreases the total reactance of its combination i. e., at corresponding frequencies.

Figure 14:
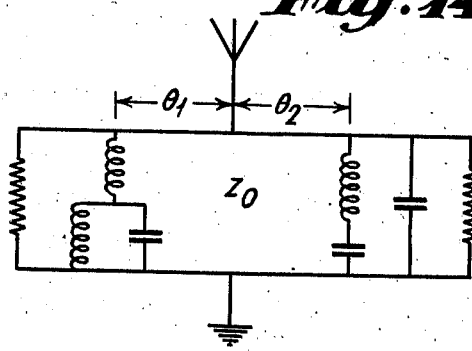

Fig. 14 shows the circuit equivalent to Fig. 13 using inverse circuits and quarter wavelength transformers so that the circuits may have one side earthed. As in the case of Figs. 7 and 9, only one inversion would be used if one of the reactive circuits were difficult to obtain in practice, or as in the case of Fig. 10 one of the circuits would be obtained by a further inversion.

The circuits shown in Figs. 13 and 14 are applicable to cases in which the sound carrier wave frequency is lower than that of the vision carrier wave frequency. In order to adapt these circuits to cases in which the sound carrier wave frequency is higher than that of the vision carrier wave, the condenser $C_1$ bridging the series circuit $lc$ in Fig. 13 is replaced by an inductance, and the inductance $L_1$ is replaced by a condenser. Similarly, in the case of Fig. 14 the inductance in series with the parallel tuned circuit is replaced by a condenser, and the condenser in parallel with the series tuned circuit is replaced by an inductance.

Circuits of the type shown in Figs. 1 to 6 may be used in place of the resistances R in Figs. 7 to 13 since, as has been stated, they are of approximately constant input resistance over the required band of frequencies. They serve to attenuate further the residue of unwanted signals in the vision and sound channels.

In all the figures the tuned circuits can theoretically be replaced by open or closed sections of transmission line. A series tuned circuit may be replaced by an open circuited odd multiple of a quarter of a wavelength or a closed circuit multiple of a half wavelength. Similarly a parallel tuned circuit may be replaced by a short circuited odd multiple of a quarter wavelength or an open circuited multiple of a half wavelength.

Figure 15:
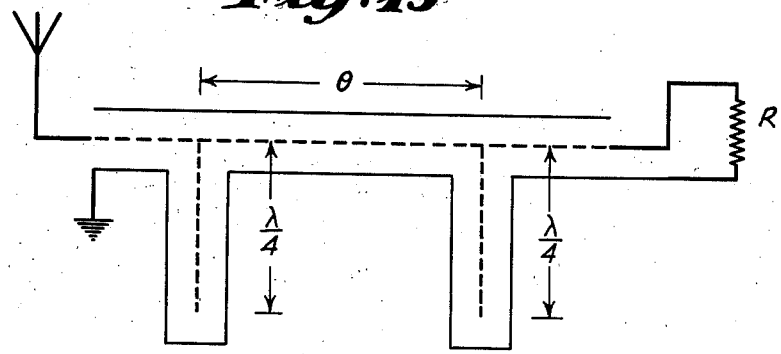

As an example of the use of such lines, Fig. 15 shows a circuit essentially equivalent to that of Fig. 1. Circuits constructed on concentric lines are particularly applicable to transmitters on account of their low losses, ability to handle high powers and convenient mechanical structure. Nevertheless a difficulty arises in obtaining the necessary selectivity. This selectivity could be obtained by forming the series tuned circuits of transmission lines with abnormally high characteristic impedances. Such a high characteristic impedance may be obtained by coiling the central conductor of a concentric line. Similarly in the case of parallel tuned circuits, lines with abnormally low characteristic impedance would be required. Such low values of characteristic impedance are impracticable.

Figure 16:
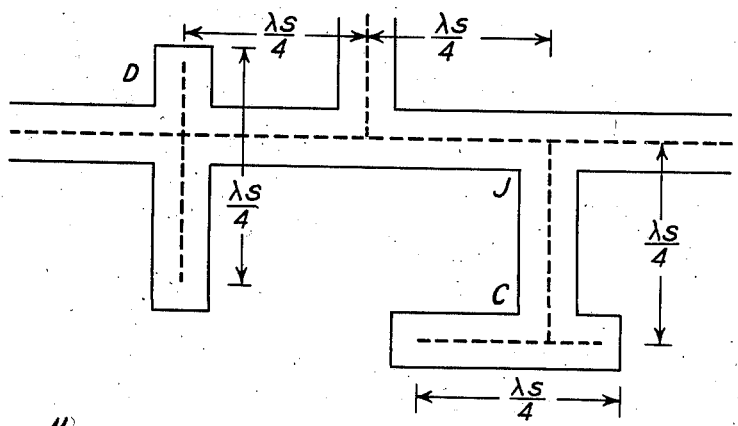

A parallel tuned circuit with the necessary selectivity can be obtained by tapping down the closed quarter wavelength line as shown at D in Fig. 16. The inverse series tuned circuit of high selectivity may be obtained by inverting the tapped quarter wavelength line of C, Fig. 16, by an additional quarter wavelength of line CJ of Fig. 16.

Fig. 16 is thus the approximate equivalent, using lines only, of Fig. 10, but on account of the imperfect auto transformer action of the tapped lines at C and D which effectively introduces leakage inductance, and the change of the electrical length of the line CJ with frequency, the arrangement of Fig. 16 is more nearly equivalent to the more effective circuit of Fig. 14.

The tapped down lines at C and D of Fig. 16 could alternatively be constructed of any odd multiple of a quarter wavelength line connected as shown, or a half wavelength multiple if closed at both ends. This allows a tapping point less near the closed end of the line for the same selectivity with the result that the maximum voltage developed on the line is reduced.

The invention is particularly applicable to the separation of any number of narrow frequency bands from each other and from a broad band in their vicinity.

The filters described may be employed at any point in a circuit at which it is desired to intermix or to separate two signals into or from a common feeder. In the case of two aerials to be fed from a common feeder supplied by two transmitters, filtering circuits would be provided at the aerials and at the transmitters.

Figure 17:
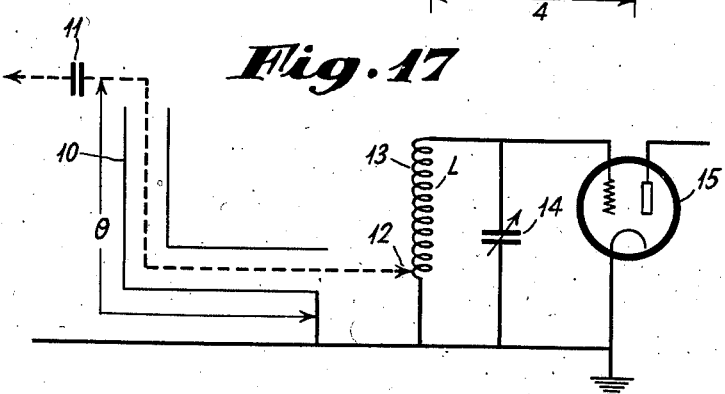

Fig. 17 shows a particular application of the invention to a circuit for selecting the sound frequency band from an aerial or other source of signals providing both the sound and vision signals of a television transmission. The tapping point 9 may be connected to an early stage of a television receiver or to any other low impedance point such as a point in an aerial feeder carrying both sound and vision signals.

The central conductor of a concentric cable 10 is connected to the tapping point 9 through a condenser 11 and at the opposite end to a tapping point 12 in a small inductance 13 shunted by a variable condenser 14 and connected to the grid of the first valve 15 in the sound channel of a television receiver. The circuit 13, 14 is tuned to the sound frequency and the tapping point 12 is selected to match the characteristic impedance of the line. The input impedance of the tapping point 9 is therefore resistive and capable of absorbing power at this frequency.

The capacity of the condenser 14 is chosen high so that the tuned circuit is very selective and in the vision range of frequencies for example, from 42.5 to 47.5 megacycles per second, the input impedance is effectively a very small inductance. The length of the cable 10 is chosen to make the input impedance at 9 infinite when terminated by said small inductance at the point 12 at an appropriate frequency.

In a particular case the capacity of condenser 14 may be about 100 micromicrofarads, the inductance 13 being adjusted to tune with this condenser to the desired frequency, and the tapping point 12 adjusted to make the tuned resistance approximately 70 megohms. The length of the cable 10 in this case is one quarter of a wavelength at the mid-frequency of the vision signals viz: 45 megacycles per second. The arrangement shown in Fig. 17 is capable of ensuring absence of interference by the vision frequencies with the sound frequencies and to enable maximum power at the sound frequencies to be transmitted to the sound channel.

Having now particularly described and ascertained the nature of our said invention and in what manner the same is to be performed, we declare that what we claim is:

1. An electric wave filter system for selecting different bands of frequencies from a source of signals containing said different bands including a transmission line, a tuned circuit in series with said line and tuned to one band of frequencies to be selected, a tuned circuit in shunt to said line and tuned to the same band of frequencies, said tuned circuits being connected in said transmission line at points spaced apart by one quarter of a wavelength at the mid-frequency of the band to which said circuits are tuned, the impedance presented by said tuned circuits to said source of signals being thereby rendered constant.

2. An electric wave filter system for selecting different bands of frequencies from a source of signals containing said different bands including a transmission line, a series tuned circuit in series with said line and tuned to one band of frequencies to be selected, a series tuned circuit in shunt to said line and tuned to the same band of frequencies, said tuned circuits being connected in said transmission line at points spaced apart by one quarter of a wavelength at the mid-frequency of the band to which said circuits are tuned, the impedance presented by said tuned circuits to said source of signals being thereby rendered constant.

3. An electric wave filter system for selecting different bands of frequencies from a source of signals containing said different bands, including a transmission line, a parallel tuned circuit in shunt to said line and tuned to one band of frequencies to be selected, a parallel tuned circuit in series with said line and tuned to the same band of frequencies, said tuned circuits being connected in said transmission line at points spaced apart by a quarter of a wavelength at the mid-frequency of the band to which said circuits are tuned, the impedance presented by said tuned circuits to said source of signals being thereby rendered constant.

4. In a television system, a filter arrangement for the separation of sound and vision signal frequencies from a single source containing said frequencies and for supplying to separate vision and sound receivers respective frequencies without appreciable attenuation, comprising a transmission line, a series tuned circuit in series with said line and tuned to the frequency of the sound signal, a series tuned circuit in shunt to said line and also tuned to the frequency of the sound signal, said tuned circuits being connected in said transmission line at points spaced apart by one-quarter of a wavelength at the mid-frequency of the band to which said circuits are tuned, the impedance presented by said tuned circuits to said source of signals being thereby rendered constant.

5. In a system for transmitting a band of frequencies, in combination, a high frequency line comprising at least one conducting path, the surge impedance of said line being substantially matched at one end of the line, a pair of similarly constructed tuned circuits tuned to the same frequency and spaced apart from each other along the length of said line an odd multiple including unity of a quarter wavelength at the mid-frequency of the band, whereby the reactance component produced at one tuned circuit is compensated by the reactance component produced at the other tuned circuit.

6. In a system for transmitting a band of frequencies, in combination, a high frequency line comprising at least one conducting path, the surge impedance of said line being substantially matched at one end of the line, a pair of parallel tuned circuits tuned to the same frequency and spaced apart from each other along the length of said line an odd multiple including unity of a quarter wavelength at the mid-frequency of the band, whereby the reactance component produced at one tuned circuit is compensated by the reactance component produced at the other tuned circuit.

7. In a system for transmitting a band of frequencies, in combination, a high frequency line comprising at least one conducting path, the surge impedance of said line being substantially matched at one end of the line, a pair of parallel tuned circuits tuned to the same frequency and spaced apart from each other along the length of said line an odd multiple including unity of a quarter wavelength at the mid-frequency of the band, said tuned circuits being serially connected in said line, whereby the reactance component produced at one tuned circuit is compensated by the reactance component produced at the other tuned circuit.

8. A high frequency transmission system comprising a transmission line, a pair of tuned circuits connected therein and spaced apart from each other by substantially one quarter of a wavelength at the mid-frequency of a given frequency band, said tuned circuits being tuned to substantially the same frequency, the reactances of said tuned circuits compensating each other over a predetermined range of frequencies.

9. An electric wave filter system for separating or combining signals extending over different frequency bands, including a length of transmission line and two circuits tuned to the same frequency and connected to said transmission line at points spaced apart from each other by substantially a quarter of a wavelength or an odd number of quarter wavelengths at a frequency in the region of that to which the circuits are tuned in order that one of said tuned circuits shall in combination with the intervening length of line, present an impedance inverse to that of the other tuned circuit at the point at which said other tuned circuit is connected.

10. A high frequency transmission for transmitting a band of frequencies, including a two-conductor transmission line and at least two series tuned circuits presenting a low resistance to a selected frequency band, said tuned circuits being connected in shunt to the conductors of said transmission line at points spaced apart by substantially one-quarter of a wavelength at the mid-frequency of said selected frequency band.

11. In combination, a pair of parallel tuned circuits tuned to the same carrier frequency, direct wire connections having uniformly distributed constants and being one-quarter of a wavelength for said carrier frequency connecting said tuned circuits together to provide an impedance inverter and a load connected to one of said tuned circuits.

12. In a high frequency transmission system for passing a band of frequencies, a first reactance network, a source of signal energy for said network, and a similar reactance network connected to said first network through a line which is electrically one-quarter wavelength long or an odd multiple thereof at the mid-frequency of said band, whereby said first reactance network is inverse to said other reactance network.

EDWARD CECIL CORK.
JOSEPH LADE PAWSEY.